Aug. 3, 1965      W. F. SKILLIN      3,198,532
TWO-JAW WEDGE CHUCK
Filed June 20, 1962      2 Sheets-Sheet 1

INVENTOR
WALTER F. SKILLIN
BY *Hopgood and Calimafde*
ATTORNEYS.

Aug. 3, 1965  W. F. SKILLIN  3,198,532
TWO-JAW WEDGE CHUCK
Filed June 20, 1962  2 Sheets-Sheet 2

INVENTOR
WALTER F. SKILLIN
BY

ATTORNEYS.

3,198,532
TWO-JAW WEDGE CHUCK
Walter F. Skillin, New Britain, Conn., assignor, by mesne assignments, to Cushman Industries, Incorporated, Hartford, Conn., a corporation of Connecticut
Filed June 20, 1962, Ser. No. 203,946
12 Claims. (Cl. 279—110)

My invention relates to an improved two-jaw chuck and particularly relates to a two-jaw chuck which can securely clamp workpieces having generally converging side surfaces.

When a workpiece having generally converging sides is clamped by the two jaws of a two-jaw chuck, it is essential that the vertical axial plane of the workpiece be precisely aligned with respect to a reference so that a tool brought in contact with the exposed surface of the workpiece cuts a precise pattern. As an example, the vertical axial plane must be parallel to the path of a drilling tool so that the resulting hole is accurately formed. The hole may thus be drilled precisely coincident with the vertical axis and no out-of-roundness occurs. Further, the two-jaw chuck must also be capable of clamping workpieces having generally converging side surfaces having different included angles.

An object of my invention is to provide a novel two-jaw chuck which can accurately position workpieces having generally converging sides.

A further object of my invention is to provide a novel two-jaw chuck which can accurately position workpieces having generally converging sides and in which the workpieces may have slight irregularities on the side surfaces.

Still another object of my invention is to provide a novel two-jaw chuck adaptable to hold workpieces having generally converging sides with different included angles.

Briefly, my invention comprises a two-jaw chuck in which each jaw has overhanging positioning elements extending from the clamping surface. The jaws move in a keyway, which, on opposite transverse sides there are fixedly positioned locator blocks adapted to receive or support a workpiece having generally converging sides. Each of the locator blocks has a suitable recess to receive a resilient deformable insert formed preferably of an elastomeric material. These inserts extend somewhat beyond the ends of the locator block and are positioned so as to be compressed by the jaws as the jaws close. The resilient inserts are held on their five sides and the resulting compression causes each to grow or expand on the exposed side. As the workpiece is in contact with the inserts, their expansion lifts the workpiece so that its upper surface is urged against the overhanging positioning elements of each jaw.

The above-mentioned and other features and objects of this invention and the manner of attaining them will become more apparent and the invention itself will be best understood by reference to the following description of an embodiment of the invention taken in conjunction with the accompanying drawing, wherein.

Figure 1:
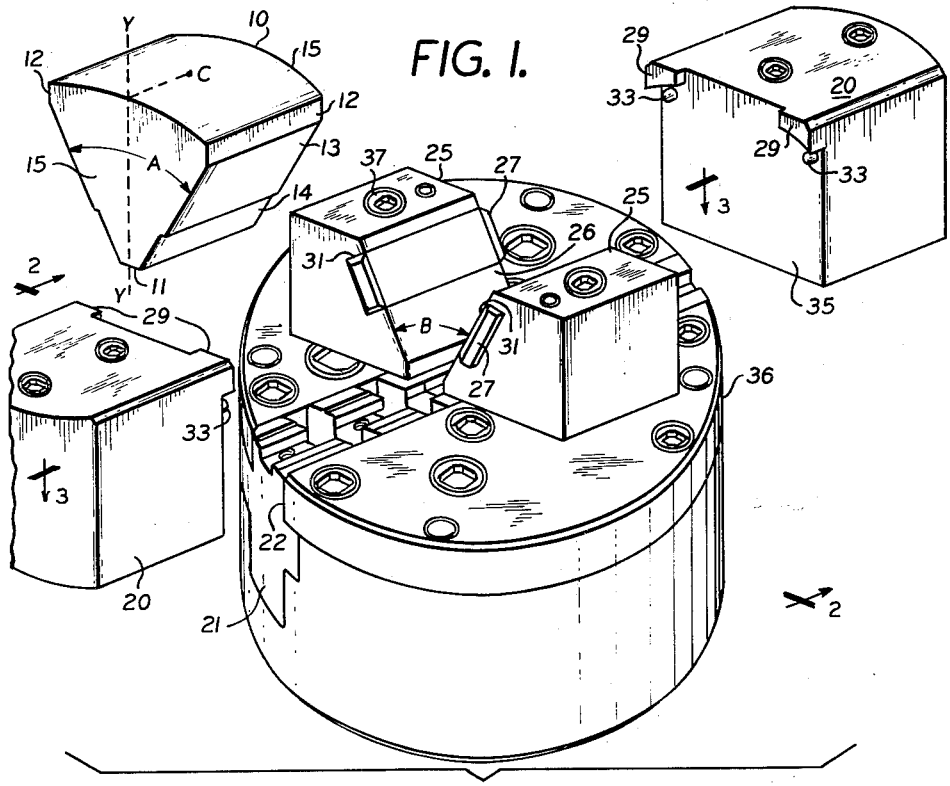
FIGURE 1 is an exploded perspective view of my chuck showing the parts thereof.

Referring now to the drawings, there is shown a workpiece 10 having generally converging sides having an included angle A therebetween and a curved top surface. This workpiece is only exemplary and other workpieces of different configurations may be utilized in conjunction with my novel invention.

Figure 4:
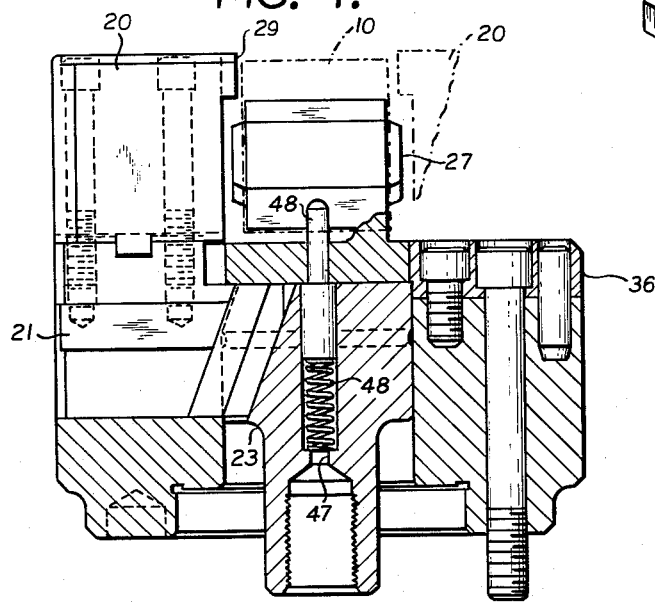
FIGURE 4 is a front sectional view along the plane of the line 4—4 of FIGURE 3.

The top jaws are indicated by the numeral 20 and are secured to a master jaw 21 (see FIGURE 4) by suitable bolts. Each master jaw is movable in a respective keyway 22 of the chuck body 36 (see FIGURE 1). The master jaws are caused to move towards each other in conventional manner as by moving the master jaw towards and away from actuating wedge 23. The driving movement of the master jaws is conventional and will not be discussed further.

Figure 2:
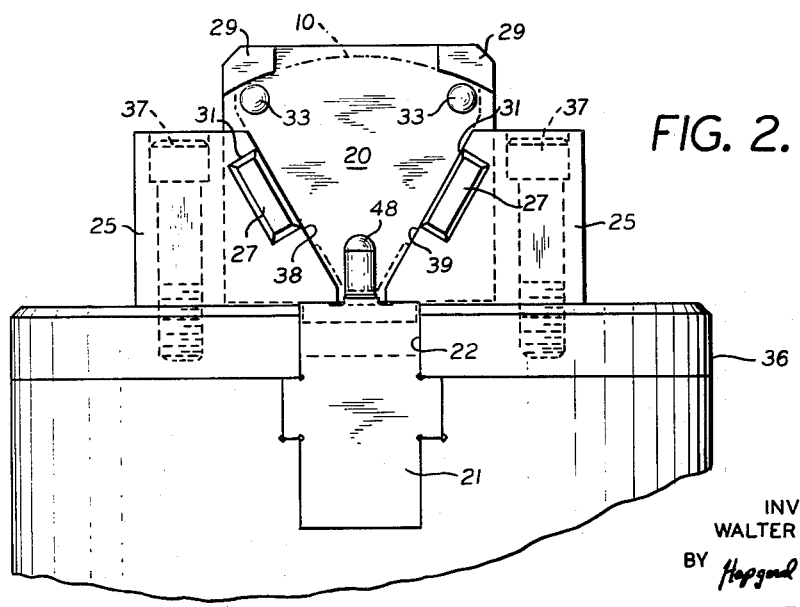
FIGURE 2 is a sectional view along the plane of the line 2—2 of FIGURE 1 showing the chuck parts in normal position with the workpiece omitted.

Each top jaw has two overhanging locator guides 29 having an arcuate under-surface with the same general contour as the upper surface of the workpiece. The four guides therefore determine the upper position of the workpiece when the jaws are closed. As shown in FIGURE 2, the contour of the workpiece is shown by the dotted line 10 and the arcuate under surfaces of the guides 29 are in contact therewith.

The workpiece shown in FIGURE 1 has flat ends 15 and generally converging sides which are formed of three sections indicated by the numerals 12, 13 and 14. The sides of the main section indicated by numeral 13 converge, and a vertical plane YY passing through a center point C bisects the included angle A. The workpiece is truncated and the base surface 11 lies between indented converging surfaces 14 generally parallel to the surface 13. Converging main surfaces 13 intersect surfaces 12 which are generally parallel to each other and to the plane of the axis YY. Parallel surfaces 12 define the respective ends of the curved top surface of the workpiece.

The workpiece is intially held between two angular locator blocks 25 which are mounted by bolts 37 across opposite transverse sides of the keyway. Each block has generally converging oppositely facing surfaces 26 which have an included angle B approximately the same as the included angle of the workpiece 10. Each locator block has an angular recess 31 having a rectangular cross section formed in the facing surface 26 to accommodate a resilient insert 27.

Figure 5:
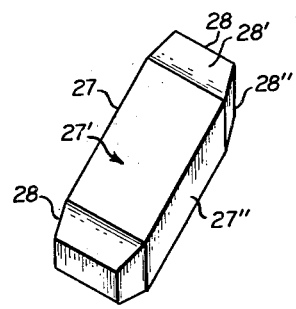
FIGURE 5 is a perspective view of the resilient insert.

A preferred form of the resilient insert 27 is shown in FIGURE 5 and has a main section and two tapered end sections 28. The main section is of a generally rectangular configuration having a rectangular top surface 27' and rectangular side surfaces 27". The end sections are formed integrally with the end surfaces of the main section and have pairs of top and side surfaces 28' and 28" which converge respectively. The ends 28 therefore have trapezoidal cross sections. The tapered ends provide a reduced end area so that the pressures applied by the jaws may be more effectively directed in a manner to cause the expansion of the resilient insert in a direction transverse to the direction in which the pressures are applied.

Figure 3:
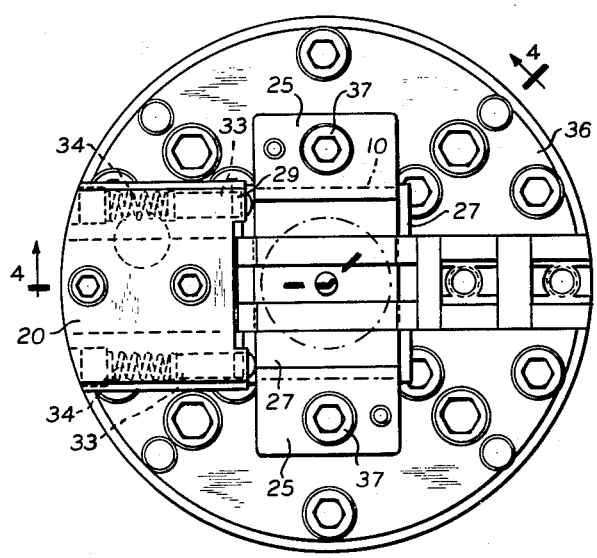
FIGURE 3 is a top view along the plane of the line 3—3 of FIGURE 1 showing the parts in normal position with the workpiece and right jaw omitted.

Each jaw is also provided with ejector or guide pins 33 which project axially towards opposing jaws and are joined to the ends of springs 34 (see FIGURE 3) supported in a bore within the top jaw. Ejector pins 33 contact the ends 15 of the workpiece to fix it in position endwise to prevent the locator guides on the top jaw from catching the workpiece and not allowing it to be ejected by the ejector pin 48. The movement of the jaws causes the resilient insert to compress causing the unconfined surface to grow in the direction towards the workpiece. This causes it to be raised into working position and guided against the arcuate under-surface of the overhanging guides 29.

It is evident that when a workpiece having an included angle differing from angle B is to be clamped, the expansion of the insert 27 may be used to compensate for angular variations and to insure uniform gripping about the axis of symmetry of the workpiece as well as correcting for slight irregularities on the side surfaces. When the workpiece 10 is initially positioned between locator blocks 25, a spring biased ejector pin 48 (see FIGURE 4) is depressed. Ejector pin 48 projects from a bore 47 formed centrally in the actuating wedge 23. The base of the bore provides a shoulder against which the spring 48' may be compressed. So long as the workpiece is clamped by the jaws, the spring of the ejector pin is in a state of compression and is so held in that manner. When the jaws are retracted, there is not a sufficient force to counteract the compressive force of the spring and the spring expands thereby ejecting the workpiece.

While the foregoing description sets forth the principles of the invention in connection with specific apparatus, it is to be understood that this description is made only by way of example and not as a limitation of the scope of the invention as set forth in the objects thereof and in the accompanying claims.

I claim:
1. A chuck comprising
   first and second top jaws movable in a keyway provided in a chuck body,
   said top jaws having overhanging guide means,
   locator blocks positioned on opposite transverse sides of the keyway adapted to receive a workpiece,
   said locator blocks having recesses to accommodate resilient deformable inserts,
   resilient deformable inserts positioned within said recesses,
   said inserts having ends which extend beyond the locator body so that when the jaws compress against said ends, the inserts grow in a direction along the expanded surface.
2. A chuck comprising
   first and second top jaws movable in a keyway provided in a chuck body,
   said top jaws having overhanging guide means,
   locator blocks positioned on opposite transverse sides of the keyway adapted to receive a workpiece,
   said locator blocks having recesses to accommodate resilient deformable inserts,
   resilient deformable inserts positioned within said recesses,
   said inserts having ends which extend beyond the locator body so that when the jaws compress against said ends, the inserts grow in a direction along the expanded surface,
   including spring biased ejector means positioned in the path of said workpiece and adapted to be compressed when the jaws are closed and said workpiece is securely held in position.
3. A chuck comprising
   first and second top jaws movable in a keyway provided in a chuck body,
   said top jaws having overhanging guide means,
   locator blocks having converging facing surfaces on opposite transverse sides of the keyway adapted to receive a workpiece,
   said locator blocks having recesses in said facing surfaces to accommodate resilient deformable inserts,
   resilient deformable inserts positioned within said recesses,
   said inserts having ends which extend beyond the locator body so that when the jaws compress against said ends, the inserts grow in a direction along the expanded surface.
4. A chuck comprising
   first and second top jaws movable in a keyway provided in a chuck body,
   each of said top jaws having axially projecting overhanging guide means having substantially arcuate undersurfaces,
   locator blocks having converging facing surfaces on opposite transverse sides of the keyway adapted to receive a workpiece,
   said locator blocks having recesses in said facing surfaces to accommodate resilient deformable inserts,
   resilient deformable inserts positioned within said recesses,
   said inserts having ends which extend beyond the locator body so that when the jaws compress against said ends, the inserts grow in a direction along the expanded surface.
5. A chuck comprising
   first and second top jaws movable in a keyway provided in a chuck body.
   each of said top jaws having axially projecting overhanging guide means having substantially arcuate undersurfaces,
   locator blocks having converging facing surfaces on opposite transverse sides of the keyway adapted to receive a workpiece,
   said locator blocks having recesses in said facing surfaces to accommodate resilient deformable inserts,
   resilient deformable inserts positioned within said recesses,
   said inserts having ends which extend beyond the locator body so that when the jaws compress against said ends, the inserts grow in a direction along the expanded surface,
   including spring biased ejector means positioned in the path of said workpiece and adapted to be compressed when the jaws are closed and said workpiece is securely held in position.
6. In combination,
   a chuck,
   a workpiece having generally converging side surfaces, said chuck comprising
   first and second top jaws movable in a keyway provided in a chuck body,
   said top jaws having overhanging guide means,
   locator blocks positioned on opposite transverse sides of the keyway adapted to receive a workpiece,
   said locator blocks having recesses to accommodate resilient deformable inserts,
   resilient deformable inserts positioned within said recesses,
   said inserts having ends which extend beyond the locator body so that when the jaws compress against said ends, the inserts grow in a direction along the expanded surface.
7. In combination,
   a chuck,
   a workpiece having generally converging side surfaces, said chuck comprising
   first and second top jaws movable in a keyway provided in a chuck body,
   each of said top jaws having axially projecting overhanging guide means having substantially arcuate under-surfaces,
   locator blocks having converging facing surfaces on opposite transverse sides of the keyway adapted to receive a workpiece,
   said locator blocks having recesses in said facing surfaces to accommodate resilient deformable inserts,
   resilient deformable inserts positioned within said recesses,
   said inserts having ends which extend beyond the locator body so that when the jaws compress against said ends, the inserts grow in a direction along the expanded surface.
8. In combination,
   a chuck,
   a workpiece having generally converging side surfaces, said chuck comprising
   first and second top jaws movable in a keyway provided in a chuck body,
   each of said top jaws having axially projecting over- hanging guide means having substantially arcuate under-surfaces, locator blocks having converging facing surfaces on opposite transverse sides of the keyway adapted to receive a workpiece, said locator blocks having recesses in said facing surfaces to accommodate resilient deformable inserts resilient deformable inserts positioned within said recesses, said inserts having ends which extend beyond the locator body so that when the jaws compress against said ends, the inserts grow in a direction along the expanded surface, said resilient insert comprising three integrally formed non-articulated sections, a first section forming the middle section and being of a generally rectangular configuration, said second and third sections being formed on the ends of said first section and having a gradually reduced cross-sectional area from said joining end to the outer end.

9. A chuck comprising first and second top jaws movable in a keyway provided in a chuck body, said top jaws having overhanging guide means and biased position elements projecting from the facing surfaces of said jaws, locator blocks positioned on opposite transverse sides of the keyway adapted to receive a workpiece, said locator blocks having recesses to accommodate resilient deformable inserts, resilient deformable inserts positioned within said recesses, said inserts having ends which extend beyond the locator body so that when the jaws compress against said ends, the inserts grow in a direction along the expanded surface.

10. In combination, a chuck, a workpiece having generally converging side surfaces, said chuck comprising first and second top jaws movable in a keyway provided in a chuck body, said top jaws having overhanging guide means and biased position elements projecting from the facing surfaces of said jaws, locator blocks positioned on opposite transverse sides of the keyway adapted to receive a workpiece, said locator blocks having recesses to accommodate resilient deformable inserts, resilient deformable inserts positioned within said recesses, said inserts having ends which extend beyond the locator body so that when the jaws compress against said ends, the inserts grow in a direction along the expanded surface.

11. In combination, a chuck, a workpiece having generally converging side surfaces, said chuck comprising first and second top jaws movable in a keyway provided in a chuck body, said top jaws having overhanging guide means, locator blocks having converging facing surfaces on opposite transverse sides of the keyway adapted to receive a workpiece, said locator blocks having recesses in said facing surfaces to accommodate resilient deformable inserts, resilient deformable inserts positioned within said recesses, said inserts having ends which extend beyond the locator body so that when the jaws compress against said ends, the inserts grow in a direction along the expanded surface.

12. The combination of claim 6 in which the included angle between the converging surfaces of said locator blocks and said workpiece are substantially the same.

References Cited by the Examiner

UNITED STATES PATENTS

| | | | |
|---|---|---|---|
| 133,010 | 11/72 | Bridges. | |
| 2,469,198 | 5/49 | La Pointe. | |
| 2,609,720 | 9/52 | Barnard | 279—123 |
| 2,639,461 | 5/53 | Fry. | |
| 2,686,058 | 8/54 | Zetterberg | 279—123 |
| 2,788,216 | 4/57 | Chasar | 279—123 |
| 2,961,764 | 11/60 | Frojd | 29—558 |
| 2,966,741 | 1/61 | Sullivan | 29—558 |
| 2,971,565 | 2/61 | Jarund | 269—274 |
| 3,020,041 | 2/62 | Peterson | 269—274 |
| 3,054,621 | 9/62 | Buck | 279—110 |

ROBERT C. RIORDON, *Primary Examiner.*

KARL J. ALBRECHT, *Examiner.*